United States Patent
Tranchet

(10) Patent No.: US 9,952,329 B2
(45) Date of Patent: Apr. 24, 2018

(54) METHOD AND DEVICE FOR DETERMINING AT LEAST ONE DATE WITH THE AID OF SATELLITE-BASED POSITIONING AND DATE-STAMPING SYSTEMS

(71) Applicant: Airbus Operations (SAS), Toulouse (FR)

(72) Inventor: Francois Tranchet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 189 days.

(21) Appl. No.: 14/867,701

(22) Filed: Sep. 28, 2015

(65) Prior Publication Data
US 2016/0097860 A1    Apr. 7, 2016

(30) Foreign Application Priority Data
Oct. 6, 2014    (FR) ..................................... 14 59550

(51) Int. Cl.
*G01S 19/33* (2010.01)
*G04R 20/04* (2013.01)

(52) U.S. Cl.
CPC .............. *G01S 19/33* (2013.01); *G04R 20/04* (2013.01)

(58) Field of Classification Search
CPC .......... G01S 19/33; G01S 19/14; G01S 19/34; G04R 20/04; G04R 20/06; G04R 20/10; G01C 21/28; H04N 1/00204
USPC .................................................. 342/357.73
See application file for complete search history.

(56) References Cited

U.S. PATENT DOCUMENTS

| | | | | |
|---|---|---|---|---|
| 5,923,287 A | * | 7/1999 | Lennen | G01S 19/36 342/357.73 |
| 7,110,669 B2 | * | 9/2006 | Ofek | H04L 12/6418 398/47 |
| 8,264,914 B2 | * | 9/2012 | Baba | G04R 20/06 368/47 |
| 8,824,244 B2 | * | 9/2014 | Kato | G04R 20/10 368/47 |
| 9,134,427 B2 | * | 9/2015 | McIntosh | G01S 19/14 |
| 9,395,700 B2 | * | 7/2016 | Oshita | G04R 20/02 |
| 9,606,515 B2 | * | 3/2017 | Hagita | G04R 20/02 |
| 2002/0021467 A1 | * | 2/2002 | Ofek | H04L 12/6418 398/87 |

(Continued)

FOREIGN PATENT DOCUMENTS

| | | | | |
|---|---|---|---|---|
| JP | 2001228271 A | * | 8/2001 | ............. G04R 20/06 |
| WO | 2011090497 | | 7/2011 | |

OTHER PUBLICATIONS

French Search Report, dated Jul. 22, 2015.

*Primary Examiner* — Bernarr E Gregory
*Assistant Examiner* — Nuzhat Pervin
(74) *Attorney, Agent, or Firm* — Greer, Burns & Crain, Ltd.

(57) ABSTRACT

A device comprising a reception unit for automatically receiving two radiofrequency signals originating from different satellite-based positioning and date-stamping systems, a data processing unit for automatically processing each of the radiofrequency signals so as to deduce time data therefrom, each time datum comprising at least one number of weeks, a calculation unit for automatically calculating a UTC date which is compatible with these time data, and a data transmission unit for automatically providing this UTC date to at least one user system.

10 Claims, 4 Drawing Sheets

(56) References Cited

U.S. PATENT DOCUMENTS

| | | | | |
|---|---|---|---|---|
| 2007/0276593 A1* | 11/2007 | Mutoh | ............... | G01C 21/28 |
| | | | | 701/478 |
| 2011/0063952 A1* | 3/2011 | Baba | ............... | G04R 20/06 |
| | | | | 368/47 |
| 2011/0181467 A1* | 7/2011 | Samavati | ............... | G01S 19/33 |
| | | | | 342/357.73 |
| 2012/0044358 A1* | 2/2012 | Thomason | ............... | H04N 1/00204 |
| | | | | 348/175 |

\* cited by examiner

METHOD AND DEVICE FOR DETERMINING AT LEAST ONE DATE WITH THE AID OF SATELLITE-BASED POSITIONING AND DATE-STAMPING SYSTEMS

CROSS-REFERENCES TO RELATED APPLICATIONS

This application claims the benefit of the French patent application No. 1459550 filed on Oct. 6, 2014, the entire disclosures of which are incorporated herein by way of reference.

BACKGROUND OF THE INVENTION

The present invention relates to a method and a device for determining at least a date of a coordinated universal time, a so-called UTC date, with the aid of satellite-based positioning and date-stamping systems.

The present invention can be implemented more particularly, although not exclusively, on an aircraft, in particular a transport airplane.

The present invention applies to the field of radio navigation and to the management of time for satellite-based positioning and date-stamping systems, of GNSS ("Global Navigation Satellite System") type.

It is known that a GNSS system uses constellations of navigation satellites and can correspond, in particular, to one of the following systems:
the GPS system ("Global Positioning System");
the Galileo system;
the Beidou system, etc.

Such a GNSS system, when it is embedded onboard an aircraft, provides the aircraft with, in particular, a time source, in addition to other information, such as position information.

In a customary manner, the time calculated in a GNSS system using the GPS system is based on a GPS time. The GPS time transmitted by satellites of the GPS system is composed of two values:
a value in seconds: GPS TOW (for "Time Of the Week"): 0 to 604800 s; and
a value in weeks: GPS WN ("Week Number"): 0 to 1023 weeks.

Because of these characteristics, there exists an ambiguity of 1023 weeks per date for the GPS system. For example, knowing that the initial reference time of the GPS system starts in the night of 5 Jan. 1980 to 6 Jan. 1980 at midnight, a GPS TOW value equal to zero seconds and a GPS WN value equal to zero weeks correspond, in particular, to the following various UTC (for "Universal Time Coordinated," i.e., "coordinated universal time") dates:
the night of Jan. 5, 1980 to Jan. 6, 1980 at midnight;
the night of Aug. 14, 1999 to Aug. 15, 1999 at midnight;
the night of Mar. 23, 2019 to Mar. 24, 2019 at midnight, etc.

An initialization of the UTC time data is therefore necessary in order to identify the correct UTC date from among the various possible dates.

SUMMARY OF THE INVENTION

An object of the present invention is to automate this initialization. It relates to a method of determining at least a date of a coordinated universal time, a so-called UTC date, which makes it possible to remove the ambiguity of a satellite-based positioning and date-stamping system without having to carry out a customary initialization such as that aforementioned.

According to the invention, said method comprises at least the following successive steps, comprising in an automatic manner:

a) receiving, for one and the same time, at least two different radiofrequency signals, a first of said radiofrequency signals originating from a first satellite-based positioning and date-stamping system, and the second of said radiofrequency signals originating from a second satellite-based positioning and date-stamping system, which is different from said first satellite-based positioning and date-stamping system;

b) processing each of said radiofrequency signals so as to deduce time data therefrom, each time datum comprising at least one number of weeks;

c) calculating a UTC date which is compatible with these time data arising from the two radiofrequency signals, said UTC date indicating at least one year; and d) providing this UTC date to at least one user system.

Thus, by virtue of the invention, a UTC date is determined automatically on the basis of radiofrequency signals originating from two different satellite-based positioning and date-stamping systems.

In a preferred embodiment, step b) comprises processing the radiofrequency signals to extract moreover, for at least one of said time data, a number of seconds as well as parameters to convert a time relating to a satellite-based positioning and date-stamping system, a so-called GNSS time, into a UTC time, and step c) comprises an additional sub-step comprising calculating a UTC time expressed to within a second, on the basis of the calculated UTC date, as well as of said number of seconds and of said parameters, so as to convert a GNSS time into a UTC time for at least one of said first and second satellite-based positioning and date-stamping systems.

Furthermore, in an advantageous manner, the method comprises an additional step, posterior to step c) and comprises:
comparing a so-called auxiliary UTC time, which is available on the aircraft, with the UTC time calculated in step c); and
emitting an alert signal if the auxiliary UTC time is different from the UTC time calculated in step c).

Moreover, in a first embodiment, step a) comprises receiving the two radiofrequency signals of one and the same receiver provided with an antenna.

Furthermore, in a second embodiment, step a) comprises receiving the two radiofrequency signals of two different receivers each provided with at least one antenna.

The present invention also relates to a device for determining at least a date relating to a coordinated universal time, a so-called UTC date.

According to the invention, said device comprises:
at least one reception unit configured to receive automatically, for one and the same time, at least two different radiofrequency signals, a first of said radiofrequency signals originating from a first satellite-based positioning and date-stamping system, and the second of said radiofrequency signals originating from a second satellite-based positioning and date-stamping system, which is different from said first satellite-based positioning and date-stamping system;
at least one data processing unit configured to process, automatically, each of said radiofrequency signals to deduce time data therefrom, each time datum comprising at least one number of weeks;

at least one calculation unit configured to automatically calculate a UTC date which is compatible with these time data arising from the two radiofrequency signals, said UTC date indicating at least one year; and at least one data transmission unit configured to provide, automatically at least this UTC date to at least one user system.

Moreover, advantageously, the calculation unit is configured to automatically calculate a UTC time, a so-called calculated UTC time, and said device comprises moreover:

at least one comparison unit configured to automatically compare a so-called auxiliary UTC time, which is available on the aircraft, with said calculated UTC time; and at least one alert unit configured to emit, automatically, an alert signal if the auxiliary UTC time is different from said calculated UTC time.

In a first particular embodiment, the reception unit is associated with a single receiver provided with an antenna, said receiver being configured to automatically receive radiofrequency signals originating at one and the same time from said different first and second satellite-based positioning and date-stamping systems.

Furthermore, in a second particular embodiment, the reception unit is associated with at least two different receivers each provided with at least one antenna, each of said receivers being configured to automatically receive different radiofrequency signals originating from another of said first and second satellite-based positioning and date-stamping systems.

The present invention also relates to an aircraft, in particular a transport airplane, which is provided with a device such as that specified hereinabove.

BRIEF DESCRIPTION OF THE DRAWINGS

The appended figures will elucidate the manner in which the invention may be embodied. In these figures, identical references designate similar elements.

DETAILED DESCRIPTION OF THE PREFERRED EMBODIMENTS

Figure 1:
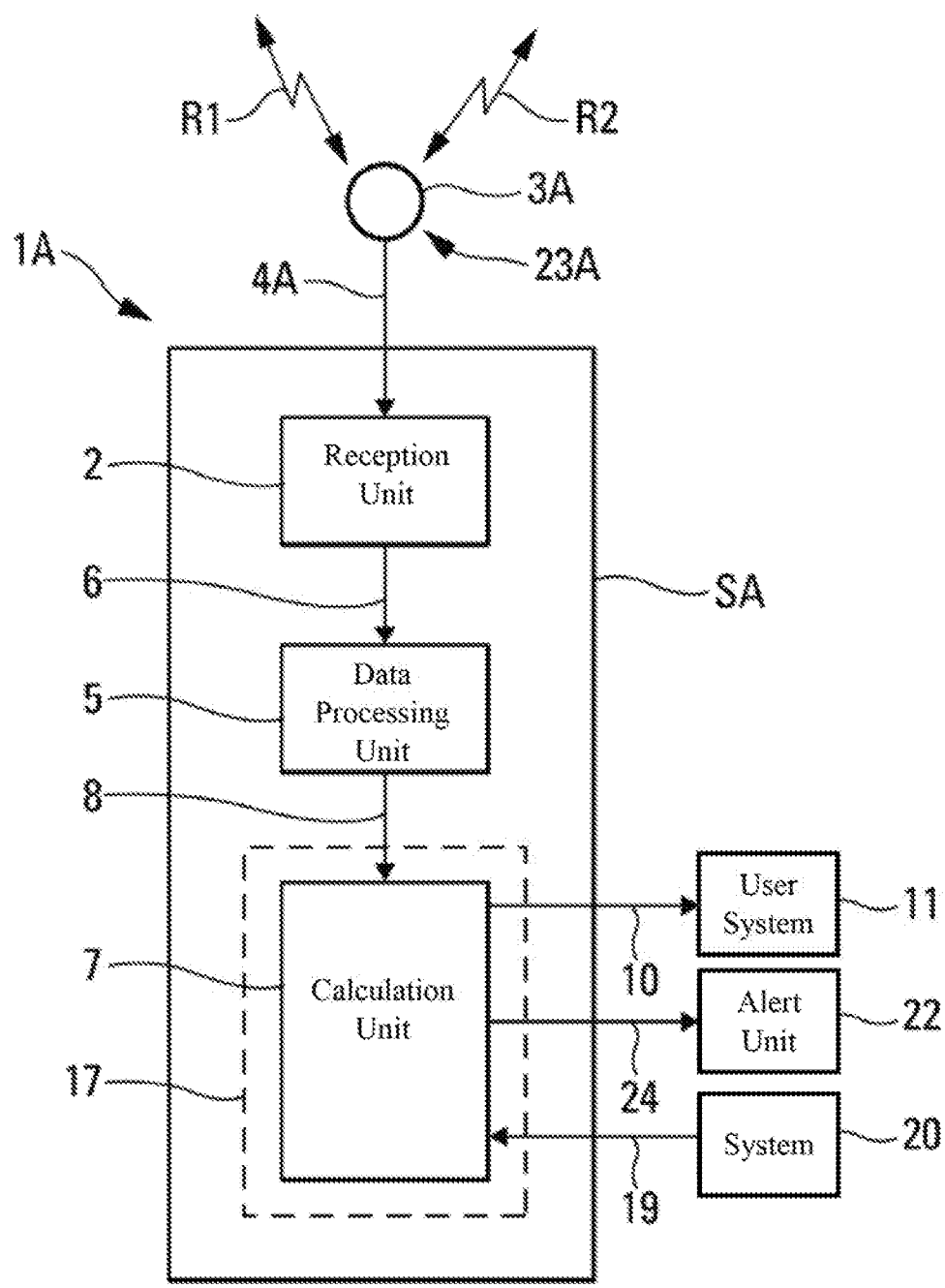
FIG. 1 is the schematic diagram of a first embodiment of a device for determining a UTC date and a UTC time.
Figure 2:
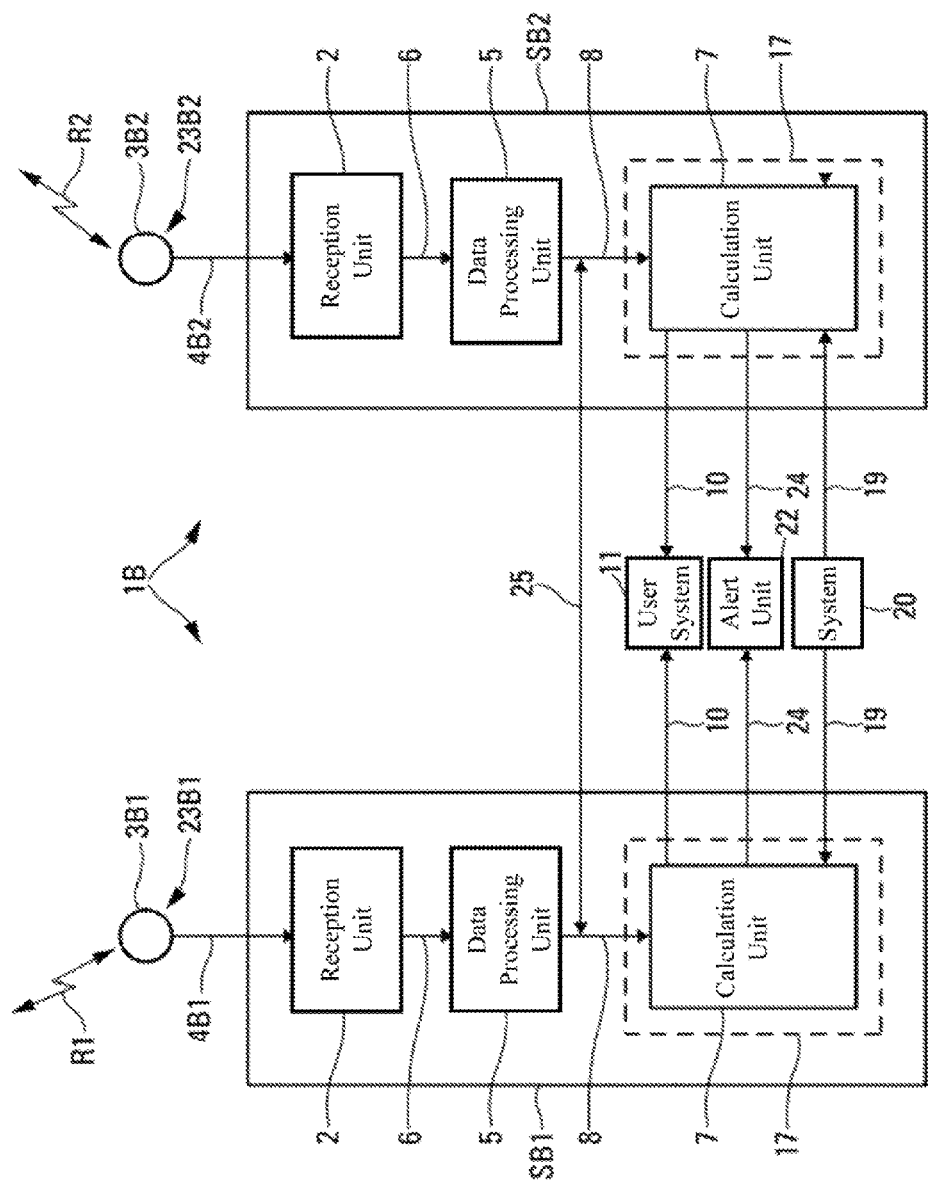
FIG. 2 is the schematic diagram of a second embodiment of a device for determining a UTC date and a UTC time.

The device 1A, 1B represented schematically according to two different embodiments, respectively, in FIGS. 1 and 2, and making it possible to illustrate the invention, is a device intended, in particular, to determine a date and a time which relate to a coordinated universal time, so-called UTC date and UTC time (UTC for "Universal Time Coordinated").

It is considered within the framework of the present invention that a UTC date is defined by year (for example 2014) or by day/month/year (for example 3 Jan. 2014), and a UTC date indicates an instant to within a second (second/minute/hour/day/month/year), for example 3 Jan. 2014 at 4 hours 20 minutes and 31 seconds.

In the following description, it is considered that the device 1A, 1B is mounted on an aircraft (not represented), in particular, a transport airplane. However, it could also be mounted on some other aerial or terrestrial craft or be used in any other application requiring information arising from such a device 1A, 1B or from a GNSS system.

A GNSS system uses in a customary manner constellations of navigation satellites and can correspond, in particular, to one of the following systems:

the GPS system ("Global Positioning System");
the Galileo system;
the Beidou system, etc.

The present invention can apply to any existing GNSS system.

Such a GNSS system, when it is embedded onboard an aircraft, provides the aircraft with, in particular, a time source, in addition to other information, geo-location information, in particular.

In a customary manner, an item of time information which is transmitted by satellites of a GNSS system is composed of two values:

a value in seconds: the so-called TOW (for "Time Of the Week") value; and
a value in weeks: the so-called WN (for "Week Number") value.

Consequently, the time considered corresponds to the time obtained by considering a number of weeks, indicated by the WN value, to which is added a number of seconds, indicated by the TOW value.

By way of illustration, the time reference is coded, for the following GNSS system examples:

GPS system:
WN is coded on 10 bits (1023 WN); and
the initial reference time is the night of Saturday Jan. 5, 1980 to Sunday Jan. 6, 1980 at midnight;

Galileo system:
WN is coded on 12 bits (4095 WN); and
the initial reference time is the night of Saturday Aug. 21, 1999 to Sunday Aug. 22, 1999 at midnight;

Beidou system:
Wn coded on 13 bits (8191 WN); and
the initial reference time is the night of Sunday Jan. 1, 2006 to Monday Jan. 2, 2006 at midnight.

The invention is described now on the basis of the first embodiment 1A, this description also applying to the second embodiment 1B for the same elements.

The device 1A comprises, as represented in FIG. 1:

a reception unit 2 configured to receive automatically, for one and the same time (that is to say, one and the same current instant), at least two different radiofrequency signals R1 and R2 (or two sets of radiofrequency signals), which are detected by a customary antenna 3A and transmitted via a link 4A. A first R1 of said radiofrequency signals originates from satellites of a first satellite-based positioning and date-stamping system, for example the GPS system, and the second R2 of said radiofrequency signals originates from satellites of a second satellite-based positioning and date-stamping system, for example the Galileo system, which is different from said first satellite-based positioning and date-stamping system;

a data processing unit 5 of customary type, which is connected via a link 6 to the reception unit 2 and which processes, automatically, each of said radiofrequency signals R1, R2 so as to deduce time data therefrom.

Each time datum (thus deduced and used hereinafter) comprises at least one number of weeks (WN value), but preferably also other information as specified hereinbelow;

a calculation unit 7 which is connected via a link 8 to the data processing unit 5 and which comprises a calculation element 9 (FIG. 3) for automatically calculating a UTC date which is compatible with these time data as specified hereinafter, said UTC date indicating at least one year as specified hereinabove; and a data transmission unit (illustrated by a link 10) which provides, automatically, this UTC date calculated by the calculation element 9 to at least one user system 11.

The user system 11 can correspond to any system onboard the aircraft, such as a calculator or a flight management system for example, that needs information generated by a GNSS system.

Thus, the device 1A such as described hereinabove determines a UTC date on the basis of radiofrequency signals R1 and R2 originating from two different satellite-based positioning and date-stamping systems, so as to make it possible to directly remove the ambiguity as regards the date (which exists for this type of system) without initialization.

In a preferred embodiment, the data processing unit 5 processes the radiofrequency signals, in a customary manner, so as to extract moreover, for at least one of said time data, a number of seconds (TOW value), as well as parameters to convert a time relating to a satellite-based positioning and date-stamping system, a so-called GNSS time, into a UTC time. These parameters comprise, in general, a temporal offset to be applied to the GNSS time to obtain the UTC time.

Figure 3:
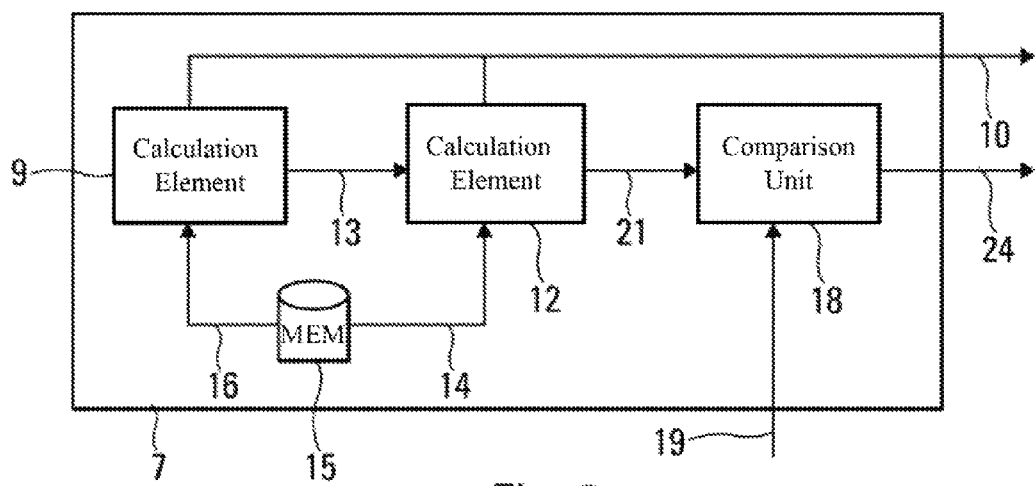
FIG. 3 is the schematic diagram of a calculation unit of the device for determining a UTC date and a UTC time.

Moreover, in this preferred embodiment, the calculation unit 7 comprises, also, as represented in FIG. 3, a calculation element 12 which is connected:

via a link 13 to the calculation element 9; and via a link 14 to a memory (15 of the calculation unit 7 or of another element of the device 1A).

This calculation element 12 calculates a UTC time expressed to within a second, on the basis of the UTC date received from the calculation element 9, as well as of the number of seconds (TOW value) and of the parameters to convert a GNSS time into a UTC time for at least one of said first and second satellite-based positioning and date-stamping systems, received from the data processing unit 5.

In a preferred embodiment, the device 1A is integrated into at least one onboard radio navigation system SA (which is associated with a satellite-based positioning and date-stamping system), and it uses means, in particular the antenna 3A and the units 2 and 5, which are already present on this system SA. Moreover, the calculation unit 7 can form part of a central unit 17 of the system SA, which carries out customary processings, and determines and provides, in particular, aircraft position and speed information.

It is however also conceivable that the various means described and, in particular, the means 3A, 2, 5 are dedicated solely to the implementation of the device 1A.

To determine the UTC date, the calculation element 9 takes account of the following data of two satellite-based positioning and date-stamping systems S1 and S2:

the number of weeks, namely a value WN1 received from the unit 5, and a value WNAbs1, for the first system S1; and the number of weeks, namely a value WN2 received from the unit 5, and a value WNAbs2, for the second system S2.

These values WNAbs1 and WNAbs2 represent the number of weeks since the start of the time of the corresponding system S1, S2. These values WNAbs1 and WNAbs2 are stored in the memory 15 of the device (and transmitted via the links 14 and 16 respectively to the calculation elements 12 and 9).

The calculation element 9 also takes account of particular relations between the parameters (and data) received to determine the UTC date. For example, if the first system S1 is the GPS system and the second system S2 is the Galileo system, the calculation element 9 takes account of the following relations:

$$WNAbs1 = K \cdot 1023 + WN1$$

$$WNAbs2 = N \cdot 4095 + WN2$$

$$WNAbs1 = WNAbs2 - 1024$$

in which N and K are two integers.

Only a single pair {N, K} satisfies the above equations.

To determine this pair, the calculation unit 9 satisfies these equations, successively for each of the following pairs: {0,0}, {1,0}, {1,1}, {2,1}, {2,2}, etc.

Only a few iterations are necessary, since for K equal to 2, the year is already 2077. When the pair {N, K} is found, the calculation unit 9 calculates, in an autonomous manner, WNAbs1 and WNAbs2 and deduces the UTC date therefrom.

Of course, the above relations apply to any existing pair of systems and can be generalized to:

$$WNAbs1 = K \cdot G1 + WN1$$

$$WNAbs2 = N \cdot G2 + WN2$$

$$WNAbs1 = WNAbs2 - G3$$

The values G1 and G2 are known for each system considered and G3 is deduced directly from the characteristics of the two systems considered.

Figure 4:
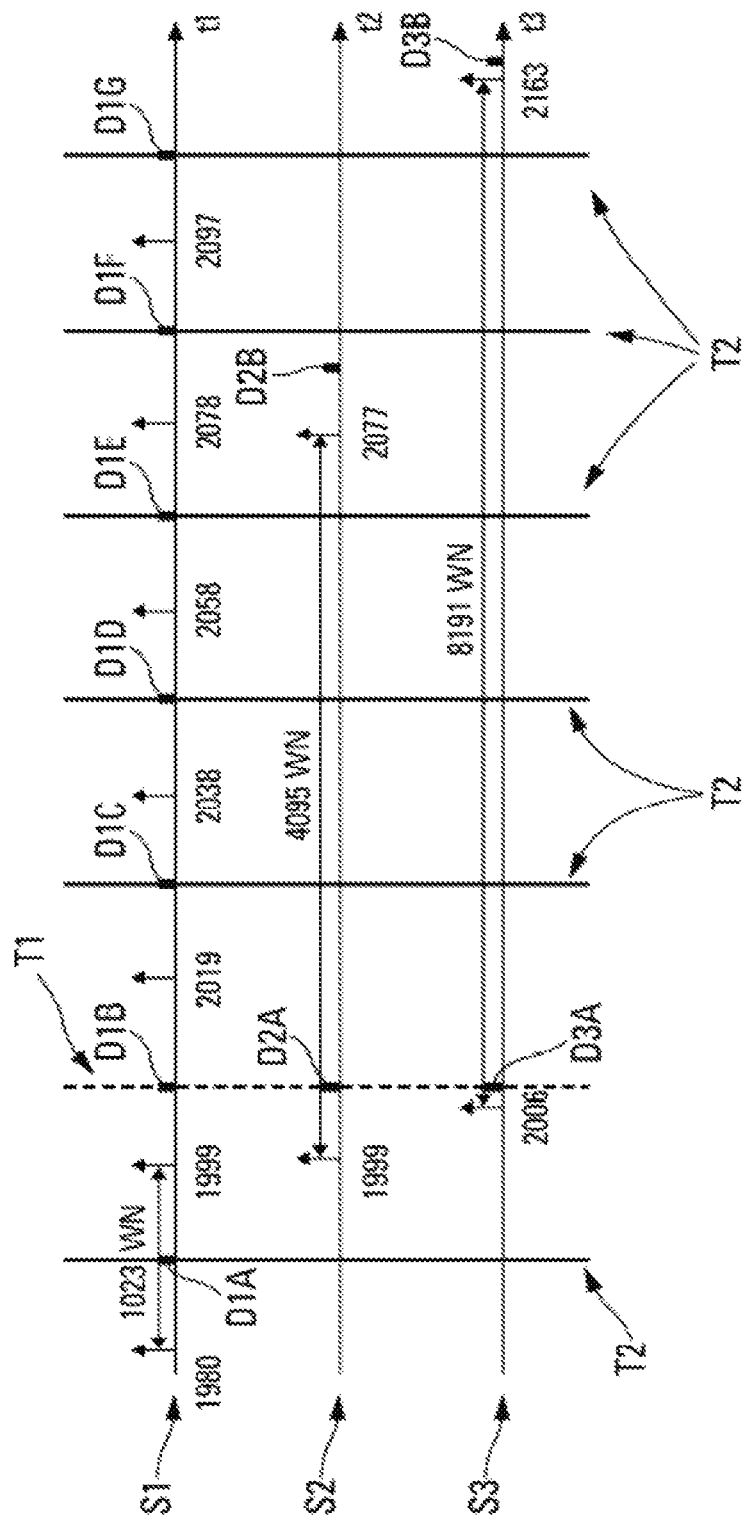
FIG. 4 is a temporal chart making it possible to explain the determination of a UTC date on the basis of data arising from various satellite-based positioning and date-stamping systems.

In the example of FIG. 4, the values of weeks WN for various systems are as follows (the time in seconds TOW is not considered in this example):

time of the GPS system (system S1 in FIG. 4): WN=400/ 1423/2446/3469/4492/etc., this corresponding to the first dates D1A to D1G represented (in FIG. 4) on a time scale t1 associated with the system S1;

time of the Galileo system (system S2 in FIG. 4): WN=398/4493/etc., this corresponding to the first dates D2A and D2B represented (in FIG. 4) on a time scale t2 associated with the system S2;

time of the Beidou system (system S3 in FIG. 4): WN=67/ 8258/etc., this corresponding to the first dates D3A and D3B represented (in FIG. 4) on a time scale t3 associated with the system S3.

The three scales t1, t2 and t3 are exactly superimposed (temporally) in FIG. 4.

The single coherent combination between two of the three previous times WN is:

time of the GPS system: WN=1423 (date D1B of FIG. 4);

time of the Galileo system: WN=398 (date D2A);

time of the Beidou system: WN=67 (date D3A).

On the basis of this information, the calculation element 9 of the calculation unit 7 can calculate, in an autonomous manner and without ambiguity, the UTC date (namely just the date D1B, D2A, D3A which is compatible) which corresponds in this example to 24 Apr. 2007, as illustrated by a vertical line T1 in FIG. 4. Also represented in FIG. 4 are vertical lines T2 passing through possible dates (D1A, D1C, etc.) of the system S1, but which are incompatible with the data of the systems S2 and S3. This UTC date is thereafter transmitted via the link 10 to at least one user system 11.

Furthermore, the calculation element 12 can calculate a UTC time expressed to within a second, on the basis of the UTC date received from the calculation element 9, as well as of the number of seconds (TOW value) and of the conversion parameters (a temporal offset) for converting a GNSS time into a UTC time, received from the data processing unit 5. The UTC time is thereafter transmitted via the link 10 to at least one user system 11.

Moreover, in a particular embodiment, the calculation unit 7 also comprises, in addition in particular to the calculation element 12 which automatically calculates a UTC time, a comparison unit 18. The comparison unit 18 automatically compares a so-called auxiliary UTC time (namely an arbitrary UTC time which is available on the aircraft and which is received via a link 19 of a system 20 of the aircraft, for example a calculator or a flight management system) with the UTC time which is calculated by the calculation element 12 and which is received via a link 21.

This comparison unit 18 which forms part of the device 1A can be integrated into the calculation unit 7 (as represented in FIG. 3) or be external to the latter.

In this particular embodiment, the device 1A also comprises an alert unit 22 which is connected via a link 24 to the comparison unit 18 and which emits, automatically, an alert signal (visual and/or audible), preferably in the flight deck of the aircraft, if the comparison unit 18 concludes that the auxiliary UTC time is different from said UTC time calculated by the calculation element 12 and is therefore erroneous.

In the first particular embodiment (device 1A), represented in FIG. 1 and described hereinabove, the reception unit 2 is associated with a single receiver 23A provided with an antenna 3A. This receiver 23A is configured to automatically receive radiofrequency signals originating from at least two different satellite-based positioning and date-stamping systems, as illustrated by two radiofrequency signals R1 and R2 both picked up by the antenna 3A.

This first embodiment exhibits a reduced number of elements and reduced bulk.

Furthermore, in a second particular embodiment represented in FIG. 2, the device 1B comprises two systems SB1 and SB2, instead of a single system SA for the device 1A of FIG. 1.

Moreover, the reception unit 2 is associated with at least two different receivers 23B1 and 23B2, each provided with at least one antenna 3B1, 3B2. Each of said antennas 3B 1 and 3B2 is linked by a link 4B 1, 4B2 to the reception unit 2 of the corresponding system SB1, SB2. Moreover, each of the receivers 23B1 and 23B2 is configured to receive, automatically, radiofrequency signals originating from one of the two satellite-based positioning and date-stamping systems, as illustrated by radiofrequency signals R1 and R2 each of which is picked up by an antenna 3B 1 and 3B2, namely the radiofrequency signal R1 by the antenna 3B 1 and the radiofrequency signal R2 by the antenna 3B2.

In this second embodiment of FIG. 2, the two systems SB1 and SB2 exchange data via in particular a link 25 linked to the links 8 of said systems SB1 and SB2. More particularly, they exchange in particular the data determined by each data processing unit 5 (on the basis of the corresponding radiofrequency signal received) and used by the calculation unit 7.

The various means of these systems SB1 and SB2 can carry out processings such as those described hereinabove for the system SA. In particular, each calculation unit 7 (of said systems SB1 and SB2) can comprise the means represented in FIG. 3 and implement all of the aforementioned processings. In a variant embodiment, it is conceivable that only one of the two calculation units 7 carries out these processings, by using the information received from the two data processing units 5.

This second embodiment exhibits the advantage of being able to be implemented on an aircraft already comprising a first system, for example the system SB1, by simply installing a second system (the system SB2) and by linking them together as indicated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of determining at least a date relating to a coordinated universal time, a so-called UTC date, comprising at least the following successive steps, comprising an automatic manner:
   a) receiving, for one and the same time, at least two different radiofrequency signals, a first of said radiofrequency signals originating from a first satellite-based positioning and date-stamping system, and the second of said radiofrequency signals originating from a second satellite-based positioning and date-stamping system, which is different from said first satellite-based positioning and date-stamping system;
   b) processing each of said radiofrequency signals so as to deduce time data therefrom, each time datum comprising at least one number of weeks;
   c) calculating a UTC date which is uniquely compatible with both the time data arising from the first radiofrequency signal and the time data arising from the second radiofrequency signal, said UTC date indicating at least one year; and
   d) providing this UTC date to at least one user system.

2. The method as claimed in claim 1, wherein step b) comprises:
   processing the radiofrequency signals so as to extract moreover, for at least one of said time data, a number of seconds as well as parameters for converting a time relating to a satellite-based positioning and data date-stamping system, a so-called GNSS time, into a UTC time, and
   wherein step c) comprises an additional sub-step comprising:
   calculating a UTC time expressed to within a second, on the basis of the calculated UTC date, as well as of said number of seconds and of said parameters so as to convert a GNSS time into a UTC time for at least one of said first and second satellite-based positioning and date-stamping systems.

3. The method as claimed in claim 2, performed on an aircraft and comprising an additional step, following step c) and comprising:

comparing a so-called auxiliary UTC time, which is available on the aircraft, with the UTC time calculated in step c); and emitting an alert signal if the auxiliary UTC time is different from the UTC time calculated in step c).

4. The method as claimed in claim 1, wherein step a) comprises receiving the two radiofrequency signals by one and the same receiver provided with an antenna.

5. The method as claimed in claim 1, wherein step a) comprises receiving the two radiofrequency signals by two different receivers each provided with at least one antenna.

6. A device for determining at least a date relating to a coordinated universal time, a so-called UTC date, which comprises:

at least one reception unit configured to receive automatically, for one and the same time, at least two different radiofrequency signals, a first of said radiofrequency signals originating from a first satellite-based positioning and date-stamping system, and the second of said radiofrequency signals originating from a second satellite-based positioning and date-stamping system, which is different from said first satellite-based positioning and date-stamping system;

at least one data processing unit configured to process, automatically, each of said radiofrequency signals so as to deduce time data therefrom, each time datum comprising at least one number of weeks;

at least one calculation unit configured to automatically calculate a UTC date which is uniquely compatible with both the time data arising from the first radiofrequency signal and the time data arising from the second radiofrequency signal, said UTC date indicating at least one year; and at least one data transmission unit configured to provide, automatically, at least this UTC date to at least one user system.

7. The device as claimed in claim 6, wherein the reception unit is associated with a single receiver provided with an antenna, said receiver being configured to automatically receive radiofrequency signals originating at one and the same time from said different first and second satellite-based positioning and date-stamping systems.

8. The device as claimed in claim 6, wherein the reception unit is associated with at least two different receivers each provided with at least one antenna, each of said receivers being configured to automatically receive different radiofrequency signals originating from another of said first and second satellite-based positioning and date-stamping systems.

9. The device as claimed in claim 6, wherein the calculation unit is configured to automatically calculate a UTC time, a so-called calculated UTC time, and wherein said device comprises moreover:

at least one comparison unit configured to automatically compare a so-called auxiliary UTC time, which is available on the aircraft, with said calculated UTC time; and at least one alert unit configured to emit, automatically, an alert signal if the auxiliary UTC time is different from said calculated UTC time.

10. An apparatus comprising:

a device as claimed in claim 6; and an aircraft, wherein the device is mounted on the aircraft.

* * * * *